US011965841B2

(12) United States Patent
Ogoshi

(10) Patent No.: US 11,965,841 B2
(45) Date of Patent: Apr. 23, 2024

(54) SURFACE ANALYZER

(71) Applicant: Shimadzu Corporation, Kyoto (JP)

(72) Inventor: Akira Ogoshi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 380 days.

(21) Appl. No.: 17/360,711

(22) Filed: Jun. 28, 2021

(65) Prior Publication Data

US 2022/0155246 A1 May 19, 2022

(30) Foreign Application Priority Data

Nov. 19, 2020 (JP) ................................. 2020-192221

(51) Int. Cl.
*G01N 23/2252* (2018.01)
*G01N 23/223* (2006.01)

(52) U.S. Cl.
CPC ....... *G01N 23/2252* (2013.01); *G01N 23/223* (2013.01); *G01N 2223/401* (2013.01)

(58) Field of Classification Search
CPC ............. G01N 23/2252; G01N 23/223; G01N 2223/401
See application file for complete search history.

(56) References Cited

U.S. PATENT DOCUMENTS

| 7,129,942 | B2 * | 10/2006 | Martin ................. | G06T 17/20 345/428 |
|---|---|---|---|---|
| 7,505,561 | B1 * | 3/2009 | Fuller ................. | A61B 6/482 378/70 |
| 2020/0027266 | A1 * | 1/2020 | Chen .................... | G06T 17/10 |

FOREIGN PATENT DOCUMENTS

| JP | 2006125952 A | 5/2006 |
|---|---|---|
| JP | 2010-091523 A | 4/2010 |
| JP | 2011153858 A | 8/2011 |
| JP | 2015-219217 B | 11/2017 |

OTHER PUBLICATIONS

Dong et al., "'Mapping of micropipes and downfalls on 4H-SiC epilayers by Candela Optical Surface Analyzer.", 2012, IEEE Publication, pp. 1-3 (Year: 2012).*
Ester et al., "A Density-Based Algorithm for Discovering Clusters in Large Spatial Databases with Noise," Proceedings of 2nd International Conference on Knowledge Discovery and Data Mining (KDD-96), pp. 226-231, 1996.

(Continued)

*Primary Examiner* — Elias Desta
(74) *Attorney, Agent, or Firm* — Muir Patent Law, PLLC

(57) ABSTRACT

A surface analyzer is provided with a measuring unit, a scatter diagram generation unit, a cluster analysis unit, and a cluster region detection unit. The measuring unit acquires a signal reflecting a quantity of each of a plurality of components or elements that are analysis targets at a plurality of positions on a sample. The scatter diagram generation unit generates a scatter diagram based on a measurement result by the measuring unit. The cluster analysis unit performs the clustering of points in the scatter diagram. The cluster region detection unit acquires, based on clustering information given to each point in the scatter diagram by the cluster analysis unit, for each cluster, cluster region boundary information on a polygon having a predetermined number or less of vertices.

5 Claims, 6 Drawing Sheets

(56) References Cited

OTHER PUBLICATIONS

Campello et al., "Density-Based Clustering Based on Hierarchical Density Estimates," Springer, pp. 160-172, 2013.
"Ramer-Douglas-Peucker algorithm", Wikipedia, <URL: https://en.wikipedia.org/wiki/Ramer%E2%80%93Douglas%E2%80%93Peucker_algorithm> [Searched Nov. 11, 2020; downloaded Jun. 17, 2021].
Wu S., et al., and one other, "A non-self-intersection Douglas-Peucker algorithm," Computer Science, Mathematics 16th Brazilian Symposium on Computer Graphics and Image Processing, pp. 60-66, 2003.
"Convex hull algorithms", Wikipedia, <URL: https://en.wikipedia.org/wiki/Convex_hull_algorithms> [Searched Nov. 11, 2020; downloaded Jun. 17, 2021].
First Office Action dated Dec. 12, 2023 issued for the corresponding Japanese Patent Application No. 2020-192221.

* cited by examiner

[Contour detection method]

SURFACE ANALYZER

CROSS-REFERENCE TO RELATED APPLICATIONS

This application claims priority under 35 U.S.C. § 119 to Japanese Patent Application No. 2020-192221 filed on Nov. 19, 2020, the entire disclosure of which is incorporated herein by reference in its entirety.

BACKGROUND OF THE INVENTION

Field of the Invention

The present invention relates to a surface analyzer for examining a distribution of components or elements present in a one-dimensional or two-dimensional measurement region on a sample. As the surface analyzer, an electron probe micro analyzer (EPMA), a scanning electron microscope (SEM), and a fluorescent X-ray analyzer can be exemplified.

Background of the Invention

An element mapping analysis using an EPMA can examine the type and the quantity of contained elements in each of a large number of minute regions in a two-dimensional region on a sample. When analyzing the results acquired by such an element mapping analysis, a phase analysis is often used. That is, a scatter diagram of the element's concentration calculated from the characteristic X-ray intensity or its intensity for two elements or three elements is generated. Then, the type and the content ratio of the compounds contained in the sample are confirmed from the distribution of the plotted points on the figure (see Patent Documents 1 and 2). For example, FIG. 10 of Patent Document 2 shows an example of a binary scatter diagram. Further, FIG. 11 of the patent document shows an exemplary ternary scatter diagram.

One point on the scatter diagram corresponds to one point (minute region) on the sample. Therefore, it is presumed that a region in which points are densely distributed on a scatter diagram corresponds to a site in which the contained elements are contained in a similar ratio on the sample. Therefore, in a phase analysis, generally, an analyst performs the following operations. An analyst performs operations of recognizing that the region in which points are densely distributed on the scatter diagram is one cluster, that is, a set of associated points, and enclosing the region with an appropriate shape, such as, e.g., a polygon, using a pointing device, such as, e.g., a mouse. In addition, an analyst performs an operation for specifying a different display color for each of the regions. When these operations are performed, a phase map is displayed on the display of the EPMA display device. In this phase map, the position on the sample corresponding to each point included in one or more cluster regions is colored in a specified color.

In recent years, with the rapid development of AI (artificial intelligence) technology, it has been attempted to automatically allocate a large number of points on a scatter diagram to a plurality of sets by using such technology. A cluster analysis, which is a typical method of unsupervised machine learning, is suitable for such processing. A variety of algorithms are known for a cluster analysis. As a method for dividing points on the scatter diagram into a plurality of clusters according to their densities, for example, a density-based clustering analysis disclosed in Non-Patent Documents 1 and 2, and the like is useful. FIG. 6 shows an example in which clusters are automatically extracted using a density-based clustering analysis for a binary scatter diagram acquired by actual measurement. In this case, it can be seen that six clusters have been extracted.

PRIOR ART DOCUMENT

Patent Document

Patent Document 1: Japanese Unexamined Patent Application Publication No. 2006-125952
Patent Document 2: Japanese Unexamined Patent Application Publication No. 2011-153858

Non-Patent Document

Non-Patent Document 1: Ester M., and three others, "A Density-Based Algorithm for Discovering Clusters in Large Spatial Databases with Noise," Proceedings of 2nd International Conference on Knowledge Discovery and Data Mining (KDD-96, pp. 226-231, 1996
Non-Patent Document 2: Ricardo J. G. B. Campello, and two others, "Density-Based Clustering Based on Hierarchical Density Estimates," Springer, pp. 160-172, 2013
Non-Patent Document 3: "Ramer-Douglas-Peucker algorithm", Wikipedia, [online], [Search Nov. 11, 2020], the Internet <URL: en.wikipedia.org/wiki/Ramer%E2%80%93Douglas%E2%80%93Peucker_algorithm>
Non-Patent Document 4: Wu S, et al., and one other, "A non-self-intersection Douglas-Peucker algorithm," Computer Science, Mathematics 16th Brazilian Symposium on Computer Graphics and Image Processing, pp. 60-66, 2003
Non-Patent Document 5: "Convex hull algorithms", Wikipedia, [online], [Search Nov. 11, 2020], the Internet <URL: en.wikipedia.org/wiki/Convex_hull_algorithms>

SUMMARY OF THE INVENTION

Problems to be Solved by the Invention

When automatically performing clustering on a scatter diagram as described above, it often occurs that the result does not coincide with the judgment on the cluster region by an analyst. One of the reasons is as follows. That is, an analyst has prior knowledge of what element is included in a sample in what ratio and makes a decision based on the knowledge. On the other hand, automatic clustering is less likely to reflect this knowledge-based information. In a phase analysis, the following tasks are also of importance. That is, while performing an operation of excluding some points on the clustering scatter diagram automatically clustered from the cluster and/or an operation of integrating a plurality of clusters into one, the analyst confirms the phase map corresponding to the operation.

Thus, the operation for the analyst to manually modify or change the result of the automatic clustering is essential to perform the phase analysis. In a case where an analyst sets the cluster region so as to surround a plurality of points with a suitable shape, such as, e.g., a polygon, on a scatter diagram as in related art, the processing of changing, etc., the area is very simple. However, the clustering information acquired by the automatic clustering is merely the identification information that each point on the scatter diagram belongs to which cluster (or does not belong to any cluster). Therefore, the position information as a region of a cluster cannot be acquired. Therefore, it is difficult for an analyst to perform operations, such as, e.g., an operation of moving, modifying, and dividing a cluster region and an operation of integrating a plurality of clusters, for automatically acquired clusters. When performing these operations, an analyst once resets the automatic clustering result. The analyst needs to manually re-specify the cluster region while referring to the result. Therefore, the operation, such as, e.g., an operation of modifying a cluster region, is considerably troublesome, and the work efficiency is poor.

The present invention has been made to solve these problems. A main object of the present invention is to provide a surface analyzer capable of easily performing operations, such as, e.g., an operation of changing, modifying, or dividing a cluster region, and integrating cluster regions, by an analyst when performing a phase analysis by specifying a cluster region based on a scatter diagram, to thereby reduce the burden on the analyst and improve the work efficiency.

Means for Solving the Problem

According to one aspect of the present invention to solve the above-described problem, a surface analyzer includes:
a measuring unit configured to acquire a signal reflecting a quantity of each of a plurality of components or elements that are analysis targets at a plurality of positions on a sample;
a scatter diagram generation unit configured to generate a scatter diagram based on a measurement result by the measuring unit;
a cluster analysis unit configured to perform clustering of points in the scatter diagram; and
a cluster region detection unit configured to acquire, based on clustering information given to each point in the scatter diagram by the cluster analysis unit, for each cluster, cluster region boundary information on a polygon having a predetermined number or less of vertices.

The surface analyzer according to the present invention is an analyzer, such as, e.g., an EPMA, an SEM, and a fluorescent X-ray analyzer. In such an analyzer, measurement is repeated while changing the position of an excitation beam (e.g., electron beam and X-ray) on a sample. Thus, it is possible to acquire a signal reflecting the abundance of a plurality of elements in each of a large number of positions in a two-dimensional region or one-dimensional region on the sample.

Effects of the Invention

In the surface analyzer according to the above-described aspect of the present invention, the cluster analysis unit performs clustering of all of the points on the scatter diagram using, for example, an algorithm of a density-based cluster analysis. With this, each of all the points on the scatter diagram is labeled such that a cluster belongs to which cluster (or a cluster does not belong). This label is clustering information. Based on at least the clustering information of each point, the cluster region detection unit acquires, for each cluster, a polygonal shape serving as a boundary line between the inside and the outside of the cluster region, as cluster region boundary information. Note that the cluster region boundary information does not necessarily include all of the labeled points of the cluster.

In the surface analyzer according to the above-described aspect of the present invention, a region occupied by each of a plurality of automatically clustered clusters in the scatter diagram can be determined. The determined cluster region has a size and position information in the scatter diagram. Therefore, according to the surface analyzer of the above-described aspect of the present invention, it is possible to easily perform processing corresponding to an operation on a shape, such as, e.g., an operation of deforming, moving, or dividing a cluster region, and an operation of integrating a plurality of cluster regions. As a result, the workload on an analyst during a phase analysis can be reduced, and the work efficiency can be improved. Further, in the analyzer according to the above-described aspect of the present invention, it is also possible to easily calculate a numerical value, such as, e.g., an area value and a perimeter of a region for each cluster, and compare them among different clusters.

EMBODIMENTS FOR CARRYING OUT THE INVENTION

Figure 1:
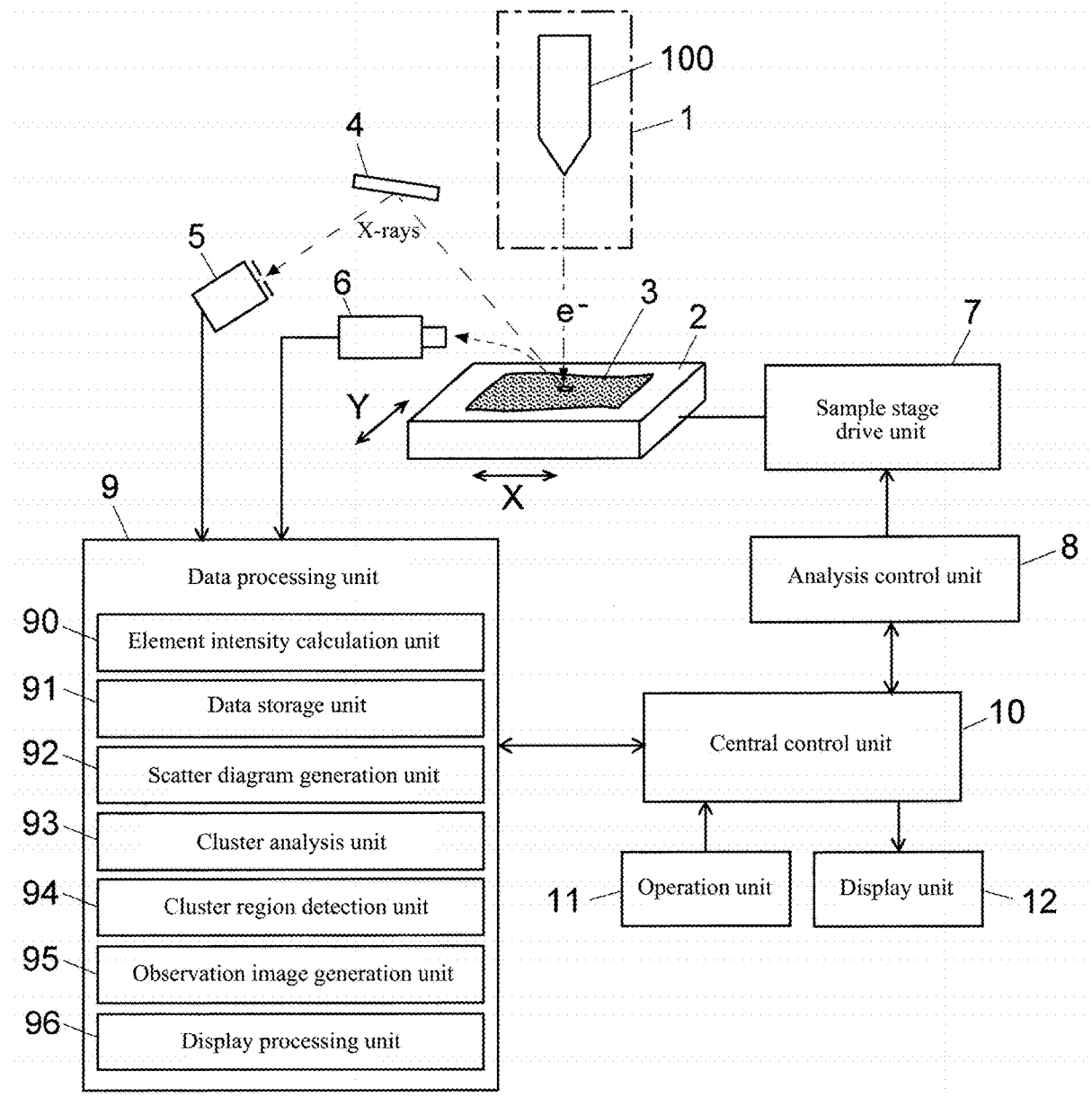
FIG. 1 is a configuration diagram of a main part of an EPMA which is an embodiment of the present invention.

An EPMA, which is a surface analyzer according to an embodiment of the present invention, will be described with reference to the accompanying drawings. FIG. 1 is a configuration diagram of a main part of the EPMA of this embodiment.

As shown in FIG. 1, an electron beam irradiation unit 1 includes an electron gun 100, a deflecting coil (not shown), or the like, and emits an electron beam of a minute diameter to a sample 3 placed on a sample stage 2. Receiving this electron beam, characteristic X-rays having a wavelength specific to an element are released from the surface of the sample 3. Further, a secondary electron and the like is also released from the surface of the sample 3.

The characteristic X-rays released from the sample 3 are wavelength-dispersed with a dispersive crystal 4. Diffracted X-rays of a particular wavelength are detected by an X-ray detector 5. The electron beam irradiation position on the sample 3, the dispersive crystal 4, and the X-ray detector 5 are always positioned on a Rowland circle. By a drive mechanism (not shown), the dispersive crystal 4 is inclined while moving linearly, and the X-ray detector 5 is rotated in conjunction with the movement. With this, in such a manner as to satisfy the Bragg's diffraction conditions, that is, while keeping the incident angle of the characteristic X-rays to the dispersive crystal 4 and the outgoing angle of the diffracted X-ray equal, the wavelength scan of the X-rays as an analysis target is achieved. The detection signal of the X-ray intensity by the X-ray detector 5 is input into a data processing unit 9. Further, the electron detector 6 detects a secondary electron emitted from the sample 3 and inputs the detection signal, which is its electronic intensity, to the data processing unit 9.

The sample stage 2 is movable in biaxial directions of the X-axis and the Y-axis perpendicular to each other by a sample stage drive unit 7, respectively. With this motion, the irradiation position of the electron beam on the sample 3 is scanned two-dimensionally. Instead of moving the sample stage 2, by deflecting the emission direction of the electron beam in the electron beam irradiation unit 1, it is also possible to scan the irradiation position of the electron beam on the sample 3.

The data processing unit 9 includes, as functional blocks, an element intensity calculation unit 90, a data storage unit 91, a scatter diagram generation unit 92, a cluster analysis unit 93, a cluster region detection unit 94, an observation image generation unit 95, and a display processing unit 96. An analysis control unit 8 controls the operations of, e.g., a drive mechanism for moving the sample stage drive unit 7, the dispersive crystal 4, and the X-ray detector 5 to perform an analysis on the sample 3. A central control unit 10 is responsible for the control and the input-output processing of the entire device. Connected to the central control unit 10 are an operation unit 11 including a keyboard and a mouse (or other pointing devices) and a display unit 12.

Note that for example, all or some of the central control unit 10, the analysis control unit 8, and the data processing unit 9 are configured by a personal computer. Each function is accomplished by executing a dedicated control/processing software installed on the computer.

When performing an element mapping analysis in an EPMA of this embodiment, the analysis control unit 8 fixes the position of the dispersive crystal 4 corresponding to the characteristic X-ray wavelength of the target element. The analysis control unit 8 operates the sample stage drive unit 7, etc., so as to repeatedly detect characteristic X-rays and a secondary electron, while changing the irradiation position (minute region) of the electron beam in a predetermined order in a predetermined two-dimensional region (usually specified by an analyst) on the sample 3. Once the intensity distribution for one element has been acquired, similar measurement is performed for other object elements. An element intensity calculation unit 90 acquires the intensity (concentration) of the target element for each minute region on the sample 3. This intensity data is stored in a data storage unit 91. Note that when an energy dispersive X-ray spectrometer is used, the element intensity calculation unit 90 can calculate the intensity (concentration) of the target element in the following manner. That is, the element intensity calculation unit 90 generates an X-ray spectrum for each minute region in the two-dimensional region, detects the peak of the specified wavelength corresponding to the target element on the X-ray spectrum, and acquires its peak intensity.

When the measurement for all of minute regions in the two-dimensional region on the sample 3 are completed and an analyst performs the predetermined operations from the operation unit 11, the scatter diagram generation unit 92 reads predetermined data from the data storage unit 91 and generates a scatter diagram (binary scatter diagram) indicating the relation between intensities of two elements. Each point on the scatter diagram corresponds to each minute region on the sample 3. Thus, for example, when the measurement is performed on 1,000 minute regions on the sample 3, the number of points plotted on the scatter diagram is 1,000.

The cluster analysis unit 93 executes clustering according to a predetermined algorithm for the points on the generated scatter diagram and labels each point as to whether each point belongs to one or more clusters or neither.

Various methods are known for a cluster analysis. Generally, in clustering points on such a scatter diagram, clustering using a distance between points is performed. In a scatter diagram acquired by a surface analysis, such as, e.g., an EPMA, there often occurs a portion in which points are present at an extremely high density and a portion in which points are present at a low density. In such a case, in a portion in which points are present at a high density, when the points are not separated into separate clusters even if the distance between points is relatively short, a cluster having an extremely large number of points will be formed. To the contrary, in a portion in which points are present at a low density, when the points are not included in the same cluster even if the distance between points is relatively long, a large number of clusters having an extremely small number of points will be formed. In order to cope with this problem, here, adopted is a density-based cluster analysis method based on a hierarchical estimation of densities disclosed in Non-Patent Document 2. This method improves the general density-based cluster analysis disclosed in Non-Patent Document 1. According to the examination of the present inventor, it is possible to perform clustering of points in a scatter diagram fairly well.

Figure 4:
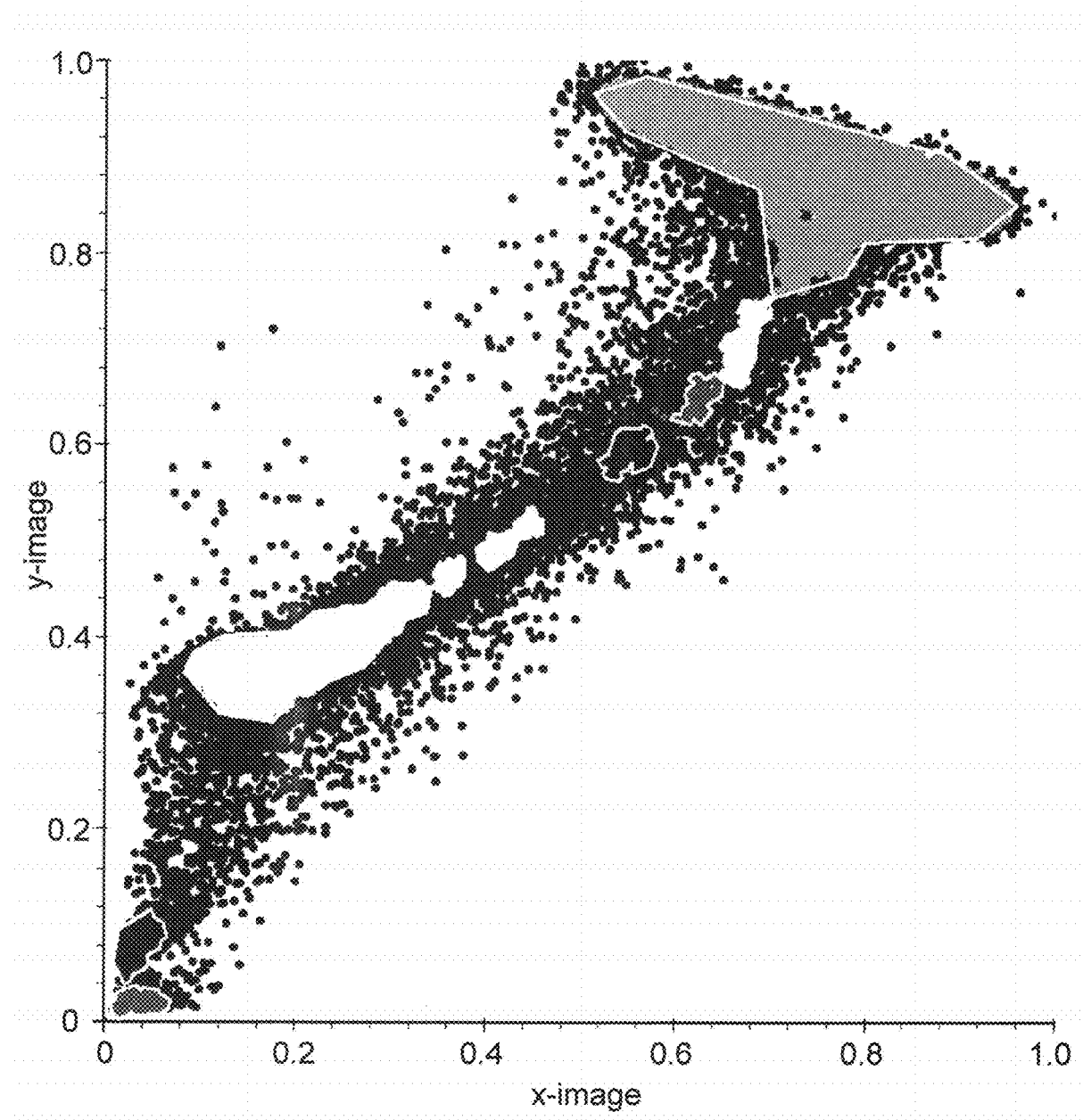
FIG. 4 is a diagram showing a cluster region boundary line generated by the processing procedure shown in FIG. 2.
Figure 5:
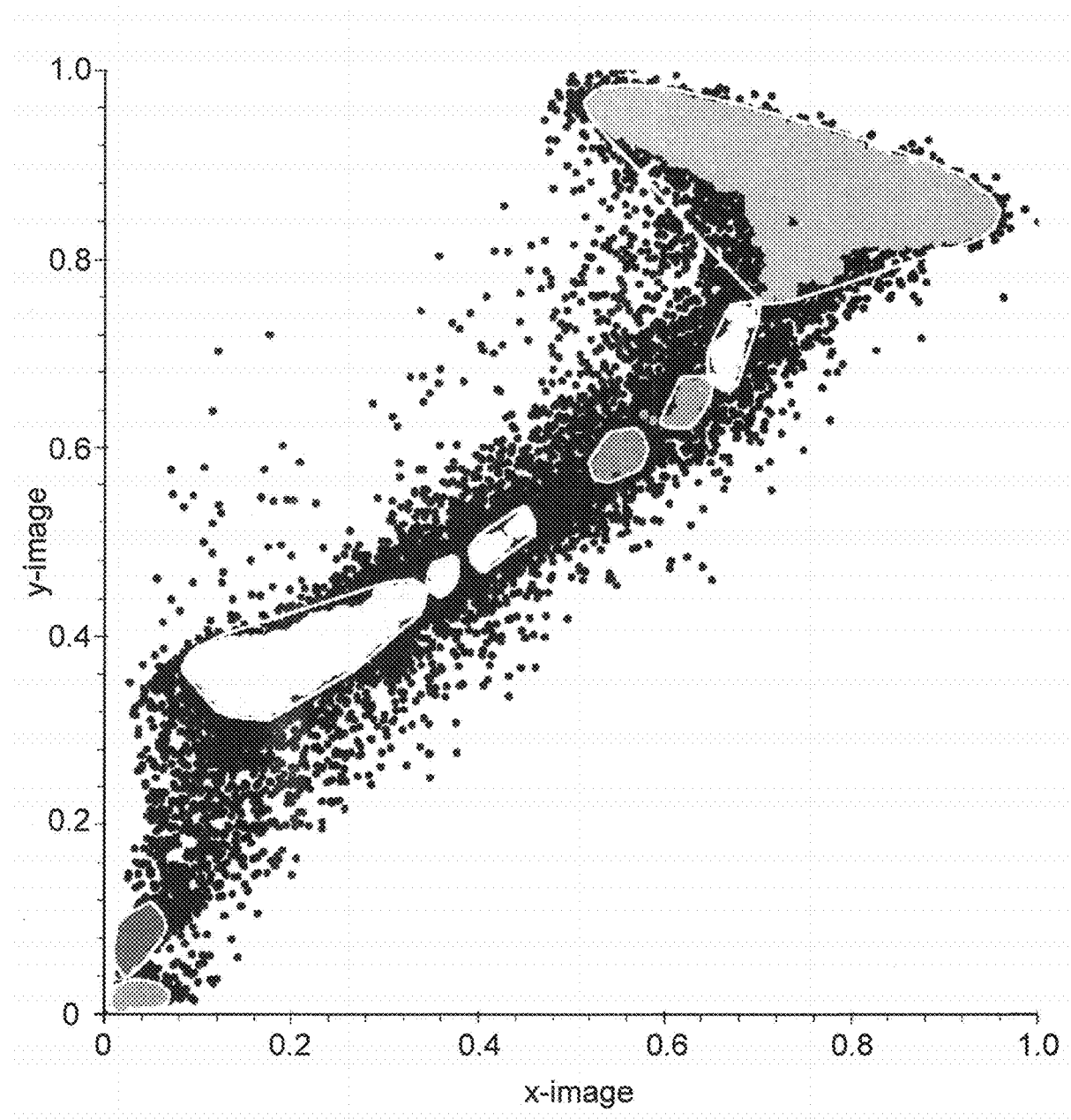
FIG. 5 is a diagram showing cluster region boundary lines generated by the processing procedure shown in FIG. 3.
Figure 6:
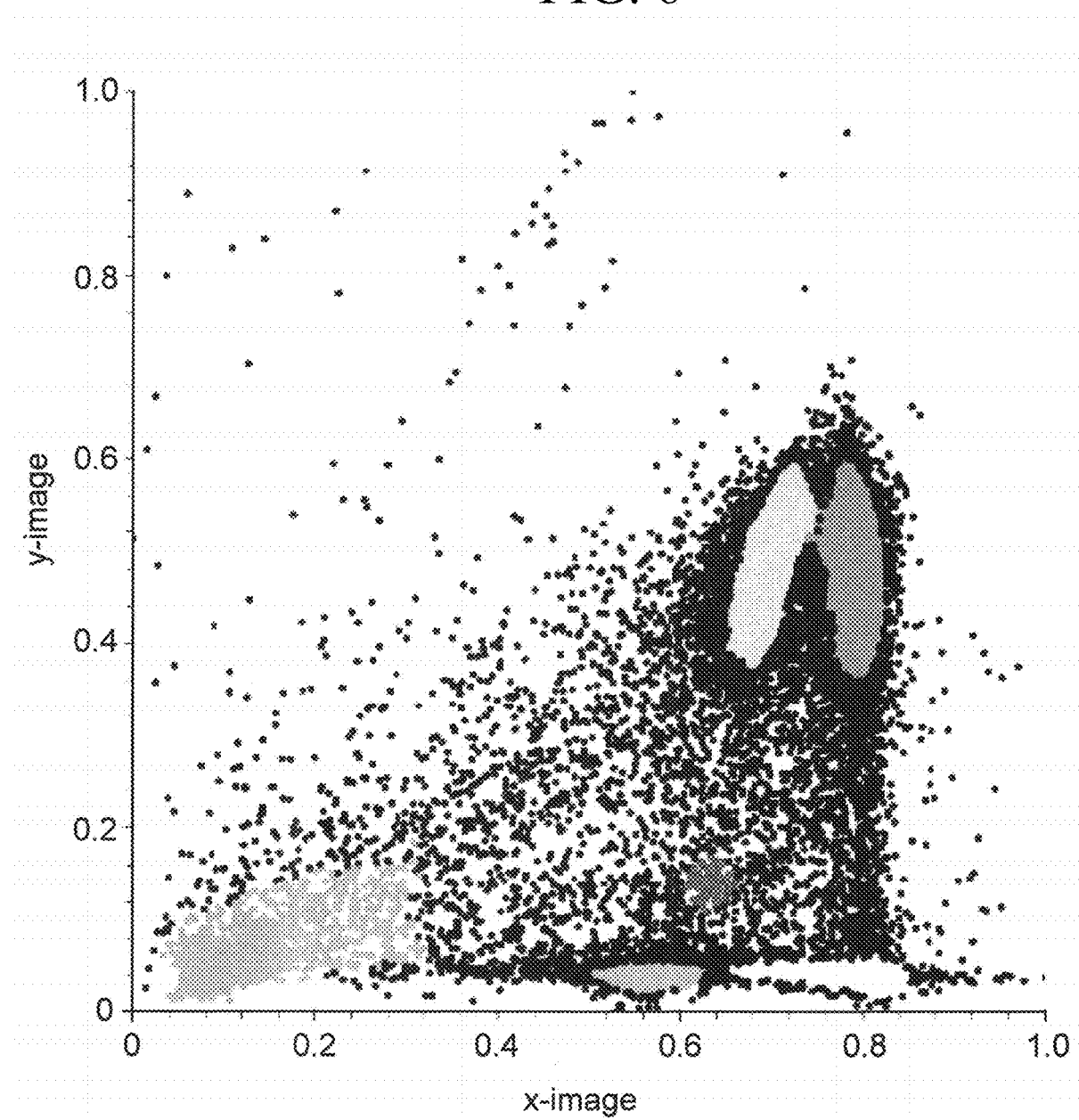
FIG. 6 is a diagram illustrating an example in which clustering is automatically performed on a binary scatter diagram.

FIG. 4 and FIG. 5 show the results of clustering performed by the above-described method on the scatter diagram acquired by the actual measurement (except for cluster region boundary lines described later). In this case, nine clusters have been extracted for the portions in which points are congested.

The result of the above-described clustering is a state in which each point on the scatter diagram is labeled with a cluster, and each cluster is only a set of points. Then, the cluster region detection unit 94 finds the region occupied by each cluster on the scatter diagram. The region corresponding to one cluster is a polygonal region in which the number of vertices is limited to a predetermined number or less.

The reason for limiting the number of vertices is to simplify the operation and processing when later modifying the shape of the cluster region or dividing or integrating the cluster regions. However, if the number of vertices is excessively small, the shape of the cluster region becomes excessively simple, and the deviation from the region where the extracted points exist becomes large. Conversely, if the number of vertices is increased, the shape of the cluster region becomes too complicated, and the operation and processing of the above-described modification and the like cannot be simplified. Therefore, in this device, the range of the upper limit of the number of vertices is determined in advance, and the user (analyst) can select the upper limit of the number within the range. Specifically, a slider is provided in a parameter setting window to be displayed on a screen, and the upper limit of the number of vertices can be changed by operating the slider.

Cluster regions can be detected in a scatter diagram by either of two methods: a contour detection method or a convex hull method. Each of them will be described.

(1) Contour Detection Method

Figure 2:
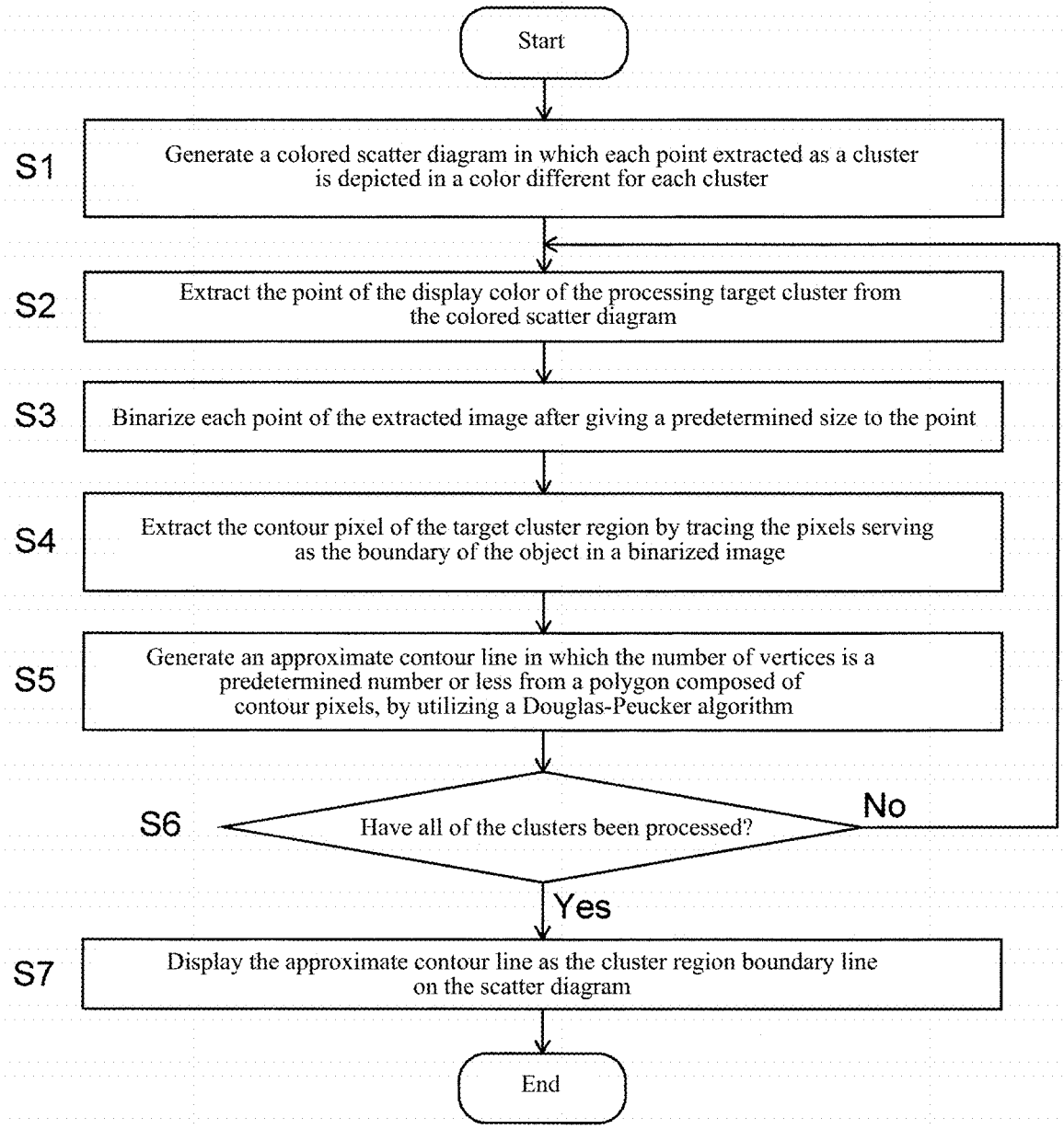
FIG. 2 is a flowchart showing an exemplary processing procedure for detecting a cluster region in the EPMA of the embodiment.

In this contour detection method, a set of points belonging to one cluster on the scatter diagram is treated as one object. The contour of the object image is extracted by image processing. The extracted contour is approximated by a polygon. The procedures of the processing at this time will be specifically described with reference to FIG. 2.

First, the cluster region detection unit 94 generates a colored scatter diagram by assigning a different display color for each cluster to each point extracted as a cluster on the scatter diagram (Step S1). Next, the cluster region detection unit 94 extracts only the points of the displayed color of one cluster, which is one of processing targets, from the colored scatter diagram to acquire an extracted image (Step S2).

This extracted image is a so-called dot drawing. Therefore, the cluster region detection unit 94 gives a predetermined size to each point on the extracted image, and then binarizes each point to acquire a binarized image (Step S3). Note that the reason why each point is given by a predetermined size on the extracted image is that pixels corresponding to two points neighboring in the immediate vicinity on the extracted image are connected to each other. Therefore, if such pixels are originally connected in the extracted image, the above-described processing may be simply binarized.

In the above-described binarized image, one object corresponding to a cluster of the processing target is white, and the background is black. The cluster region detection unit 94 scans pixel by pixel in sequence from, for example, the pixel at the upper left end of the entire image. The cluster region detection unit 94 recognizes the first white pixel found as the start point of one object contour. Then, the cluster region detection unit 94 traces white pixels in contact with black pixels in the counterclockwise direction from the pixel of the start point in a sequence. After returning to the pixel of the start point, the search for the contour line of the object is finished. As described above, the cluster region detection unit 94 extracts the contour pixels constituting the contour line of one object (Step S4). Note that, as in the examples of FIG. 4 and FIG. 5, the entirety of one object is not necessarily configured by only white pixels, and some of the inner side pixels may be black. Therefore, it is recommended to impose a condition on the search so as not to extract white pixels in contact with the isolated region of black pixels inside the object.

The contour line of the object corresponding to one cluster region is acquired by the image processing in Step S4. Note that in many cases, this contour line is a polygonal shape having very large numbers of vertices. The contour line is substantially close to a curve. Therefore, the cluster region detection unit 94 acquires an approximate contour line by performing a process of approximating the acquired contour line by a polygonal shape having a predetermined number or less of vertices. A well-known Douglas-Peucker algorithm (see Non-Patent Documents 3 and 4) can be used for this processing (Step S5). Generally, the Douglas-Peucker algorithm is an algorithm that simplifies a polygonal line segment having a plurality of points. In the case of a polygonal shape, it is well known that the Douglas-Peucker algorithm can be extended to a polygonal shape by arbitrarily selecting two points from vertices and setting them as an initial line polygonal segment.

By the processing in Step S5, an approximate contour line defining one cluster region can be acquired. This approximate contour line is represented by coordinates of vertices of a polygon representing the outline. The coordinate of the vertex in this instance is a position of a pixel on the scatter diagram. Next, the cluster region detection unit 94 determines whether or not the processing has been completed for all of the clusters extracted in the scatter diagram (Step S6). When there is an unprocessed cluster, the processing returns to Step 2, and the processing of Steps S2 to S6 is executed for the subsequent processing target cluster.

By repeating the processing of Steps S2 to S6 by the number of the extracted clusters, the approximate contour line can be acquired for all of the clusters on the scatter diagram. Then, the display processing unit 96 displays the approximate contour line as a cluster region boundary line on the scatter diagram (Step S7).

FIG. 4 shows cluster region boundary lines acquired by the contour detection method. As can be seen from FIG. 4, in the cluster region boundary lines generated by the contour detection method, points belonging to the cluster may be present outside the boundary line. However, the range of the set of the points belonging to the cluster is well defined.

(2) Convex Hull Method

Figure 3:
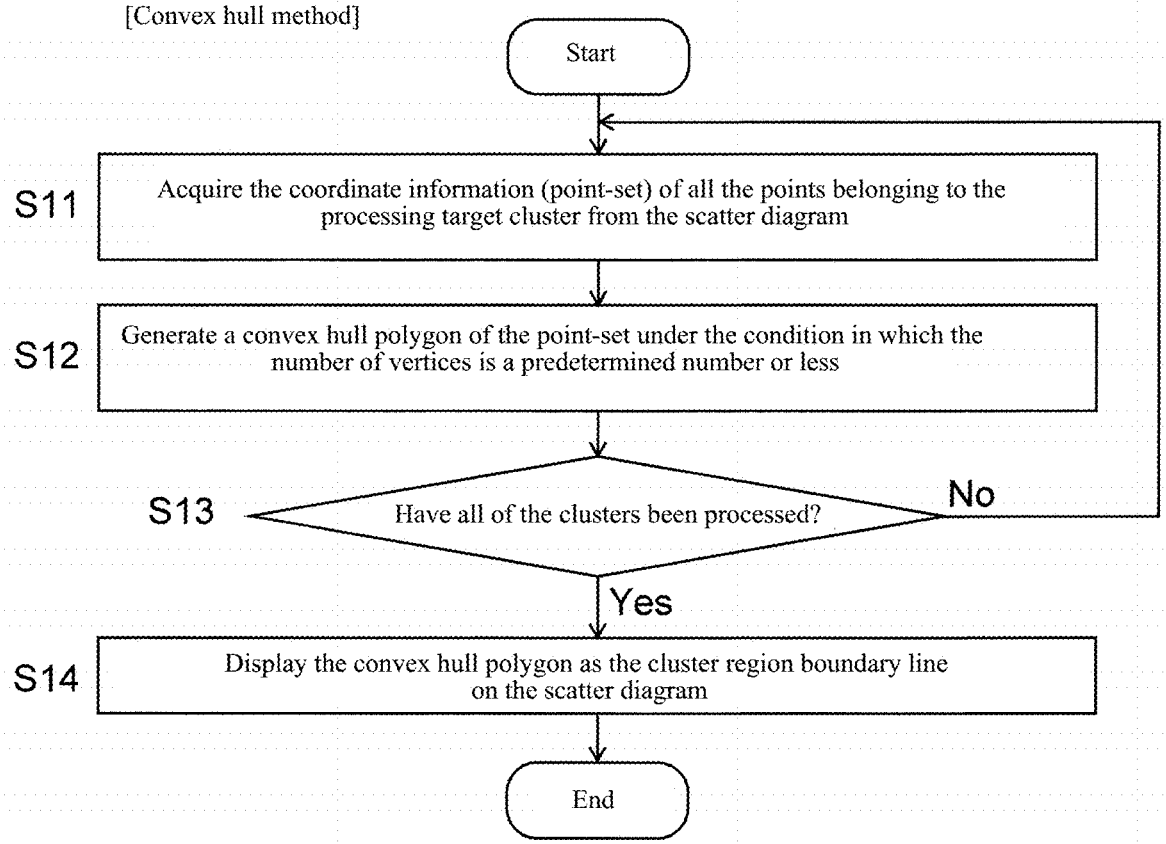
FIG. 3 is a flowchart showing another exemplary processing procedure for detecting cluster regions in the EPMA of the embodiment.

A convex hull means the smallest convex polygon encompassing all of given points. As disclosed in Non-Patent Document 5, various algorithms are known for a convex hull method. In any algorithms, it is possible to acquire a polygon containing all of specified points. The procedure of the processing at this time will be specifically described with reference to FIG. 3.

First, the cluster region detection unit 94 extracts all of the points belonging to one cluster, which is a processing target, from all of the points on the scatter diagram. Then, the cluster region detection unit 94 acquires the position information (x, y coordinate on the scatter diagram) of each point in the point-set (Step S11). Thereafter, the cluster region detection unit 94 determines a convex hull polygon containing all of the points contained in the point-set by a convex hull method by subjecting to the condition that the number of vertices is a predetermined number or less (Step S12).

Next, the cluster region detection unit 94 determines whether or not the processing has been completed for all of the clusters extracted in the scatter diagram (Step S13). When there is an unprocessed cluster, the processing returns to Step 11, and the cluster region detection unit 94 executes the processing of Steps S11 to S13 for the subsequent processing target cluster. By repeating the processing of Steps S11 to S13 by the number of the extracted clusters, it is possible to acquire the convex hull polygon for every clusters on the scatter diagram. Also in this case, the convex hull polygon is represented by the coordinate of the vertices of the polygon. Then, the display processing unit 96 displays the convex hull polygon as cluster region boundary lines on the scatter diagram (Step S14).

FIG. 5 shows cluster region boundary lines acquired by the convex hull method. As can be seen from FIG. 5, the cluster region boundary lines generated by this convex hull method is likely to include points that does not belong to the cluster as compared with the contour detection method. However, the cluster region can be defined without omitting the points belonging to the cluster.

In the EPMA of this embodiment, the polygonal cluster region can be determined based on the results of the automatic clustering of each point in the scatter diagram as described above. For example, when performing a phase analysis, the following processing is performed in a case where an analyst modifies the shape of the cluster region or integrates a plurality of cluster regions.

When an analyst performs a prescribed operation to perform a phase analysis with the operation unit 11, the display processing unit 96 displays a phase analysis screen in which the scatter diagram and the distribution map are arranged side by side on the screen of the display unit 12. As a distribution map, an SEM image of the measurement region on the sample 3 generated by the observation image generation unit 95 based on the secondary electron intensity data is displayed. As the scatter diagram, a scatter diagram in which cluster region boundary lines are superimposed as shown in FIG. 4 or FIG. 5 is displayed.

When an analyst wants to deform, for example, the shape of the cluster region, the analyst specifies, by means of the operation unit 11, the vertex of the cluster region boundary line desired to be deformed on the scatter diagram. And, the analyst moves the vertex to any position on the scatter diagram by dragging it. This deforms the shape of the cluster region boundary line. In a case where it is desired to integrate several cluster regions into a single cluster region, the following operations are performed. For example, an operation of deleting the straight line connecting two vertices in each cluster region boundary line in a plurality of cluster regions is performed. In place of the deleted straight line, a new straight line is added between the vertices of the different cluster region boundary lines. With this, it is possible to integrate a plurality of cluster regions. Thus, the operations for moving, modifying, or dividing a cluster, or integrating a plurality of cluster regions are very simple. Also, the processing corresponding to these operations substantially only changes the coordinate of the vertex of the polygonal cluster region boundary line. Therefore, the processing in the computer is also very simple and its load is small.

Note that the above-described embodiment is an EPMA. However, the present invention is applicable to a variety of analyzers in general, such as an SEM, a fluorescent X-ray analyzer, and the like, which are capable of acquiring a signal reflecting the amount of an element and a component (such as a compound) in a large number of minute regions in a one-dimensional or two-dimensional area on a sample. That is, the present invention may be applicable to any analyzer capable of performing a mapping analysis regardless of the measuring method or the analysis method itself.

Further note that the above-described embodiment is merely an example of the present invention, and it is needless to say that even if appropriate modification, change, addition, and the like are performed within the spirit of the present invention, they are encompassed by claims.

[Various Aspects]

It is apparent to those skilled in the art that the above-described exemplary embodiments are specific examples of the following aspects.

(Item 1)

According to a surface analyzer according to one aspect of the present invention, a surface analyzer includes:
- a measuring unit configured to acquire a signal reflecting a quantity of each of a plurality of components or elements that are analysis targets at a plurality of positions on a sample;
- a scatter diagram generation unit configured to generate a scatter diagram based on measurement results by the measuring unit;
- a cluster analysis unit configured to perform clustering of points in the scatter diagram; and
- a cluster region detection unit configured to acquire, based on clustering information given to each point in the scatter diagram by the cluster analysis unit, for each cluster, cluster region boundary information on a polygon having a predetermined number or less of vertices.

In the surface analyzer according to the first aspect, the region occupied by each of a plurality of clusters automatically clustered in a scatter diagram can be determined. This determined cluster region has a size and position information in the scatter diagram. Therefore, according to the device recited in the above-described Item [1], it is possible to easily perform operations as graphics, such as, e.g., an operation of deforming, moving, dividing a cluster region, and an operation of integrating a plurality of cluster regions, and processing corresponding thereto. This reduces the workload on the analyst during the phase analysis and improves the work efficiency. Further, according to the device of the first aspect of the present invention, it becomes possible to calculate the numerical values, such as, e.g., the area value and the perimeter of a region for each cluster and compare these values between different clusters.

(Item 2)

In the surface analyzer as recited in the above-described Item [1], it may be configured as follows.

That is, the cluster region detection unit extracts all of the points belonging to one cluster in the scatter diagram, acquires a contour line of one object corresponding to a set of the points from a binary image representing the set, and acquires cluster region boundary information by approximating the contour line with the polygon having the predetermined number or less of vertices.

(Item 3)

In the surface analyzer as recited in the above-described Item [2], it may be configured as follows.

The cluster region detection unit approximates the polygon by using a Douglas-Peucker algorithm.

According to the surface analyzer as recited in the above-described Items [2] and [3], it is possible to acquire a cluster region boundary information that includes most of the points belonging to one cluster and hardly includes the points not belonging to the cluster.

(Item 4)

In the surface analyzer as recited in the above-described Item [1], it may be configured as follows.

The cluster region detection unit extracts all of the points belonging to one cluster in the scatter diagram and acquires cluster region boundary information by calculating a convex hull polygon including all of the points by utilizing position information on the points in the scatter diagram.

According to the surface analyzer as recited in the above-described Item [4], it is possible to acquire such cluster region boundary information that all of the points belonging to one cluster are contained without omission.

(Item 5)

In the surface analyzer as recited in any one of the above-described Items [1] to [4], it may be configured as follows.

The surface analyzer further includes:
- a display processing unit,
- wherein the display processing unit is configured to
  - display the cluster region boundary information acquired for each cluster on the scatter diagram in a superimposed manner,
  - select a vertex on the cluster region boundary information on the scatter diagram, and
  - receive a modification of a cluster region, the modification being performed by an operation of moving the selected vertex to an arbitrary position.

As described above, polygonal cluster region boundary information is essentially composed of position information of polygon's vertices, and the movement of the vertex in the cluster region boundary information is a simple change of the position information. Therefore, according to the surface analyzer as recited in the above-described Item [5], it is easy to perform the operation of deforming, moving, or dividing the shape of the cluster region, and integrating the cluster regions. The processing within the device corresponding to the operation is also very simple.

DESCRIPTION OF SYMBOLS

1: Electron beam irradiation unit
100: Electron gun
2: Sample stage
3: Sample
4: Dispersive crystal
5: X-ray detector
6: Electron detector
7: Sample stage drive unit
8: Analysis control unit
9: Data processing unit
90: Element intensity calculation unit
91: Data storage unit
92: Scatter diagram generation unit
93: Cluster analysis unit
94: Cluster region detection unit
95: Observation image generation unit
96: Display processing unit
10: Central control unit
11: Operation unit
12: Display unit

The invention claimed is:

1. A surface analyzer comprising:
a measuring unit configured to acquire a signal reflecting a quantity of each of a plurality of components or elements that comprise analysis targets at a plurality of positions on a sample;
a scatter diagram generation unit configured to generate a scatter diagram based on a measurement result by the measuring unit;
a cluster analysis unit configured to perform clustering of points in the scatter diagram; and
a cluster region detection unit configured to acquire, based on clustering information given to each point in the scatter diagram by the cluster analysis unit, for each cluster, cluster region boundary information on a polygon having a predetermined number or less of vertices.

2. The surface analyzer as recited in claim 1, wherein the cluster region detection unit extracts all of the points belonging to one cluster in the scatter diagram, acquires a contour line of one object corresponding to a set of the points from a binary image representing the set, and acquires cluster region boundary information by approximating the contour line with the polygon having the predetermined number or less of vertices.

3. The surface analyzer as recited in claim 2, wherein the cluster region detection unit approximates the polygon by using a Douglas-Peucker algorithm.

4. The surface analyzer as recited in claim 1, wherein the cluster region detection unit extracts all of the points belonging to one cluster in the scatter diagram and acquires cluster region boundary information by calculating a convex hull polygon including all of the points by utilizing position information on the points in the scatter diagram.

5. The surface analyzer as recited in claim 1, further comprising:
a display processing unit,
wherein the display processing unit is configured to
display the cluster region boundary information acquired for each cluster on the scatter diagram in a superimposed manner,
select a vertex on the cluster region boundary information on the scatter diagram, and
receive a modification of a cluster region, the modification being performed by an operation of moving the selected vertex to an arbitrary position.

* * * * *